United States Patent [19]
Kasdan

[11] Patent Number: 5,619,032
[45] Date of Patent: Apr. 8, 1997

[54] METHOD AND APPARATUS FOR AUTOMATICALLY SELECTING THE BEST FOCAL POSITION FROM A PLURALITY OF FOCAL POSITIONS FOR A FOCUSING APPARATUS

[75] Inventor: Harvey L. Kasdan, Van Nuys, Calif.

[73] Assignee: International Remote Imaging Systems, Inc., Chatsworth, Calif.

[21] Appl. No.: 374,227

[22] Filed: Jan. 18, 1995

[51] Int. Cl.$^6$ .................... G01J 1/20; G03B 3/10
[52] U.S. Cl. .................... 250/201.3; 348/79
[58] Field of Search ............ 250/201.3, 201.2; 348/79; 382/199

[56] References Cited

U.S. PATENT DOCUMENTS

| | | |
|---|---|---|
| 4,012,634 | 3/1977 | Bouton et al. ............ 250/201.3 |
| 4,338,024 | 7/1982 | Bolz et al. . |
| 4,538,299 | 8/1985 | DeForest . |
| 4,945,220 | 7/1990 | Mallory et al. ............ 250/201.3 |
| 5,003,165 | 3/1991 | Sarfati et al. . |
| 5,030,981 | 7/1991 | Matsuzaki et al. ............ 354/402 |
| 5,225,940 | 7/1993 | Ishii et al. ............ 359/823 |

Primary Examiner—Stephone Allen
Attorney, Agent, or Firm—Limbach & Limbach L.L.P.; Ronald L. Yin

[57] ABSTRACT

A method and apparatus for selecting the best focal position of an image in a field of view is based upon pixel values located in the image that correspond to locations defining an invariant optical property of the image. In the preferred embodiment, the invariant optical property of the image are pixels that form a "halo" that surround the boundary of an object and are contiguous and immediately adjacent thereto. It has been determined that a certain relationship should exist for this "halo" that surround the boundary of an object when the best focal position is selected.

28 Claims, 3 Drawing Sheets

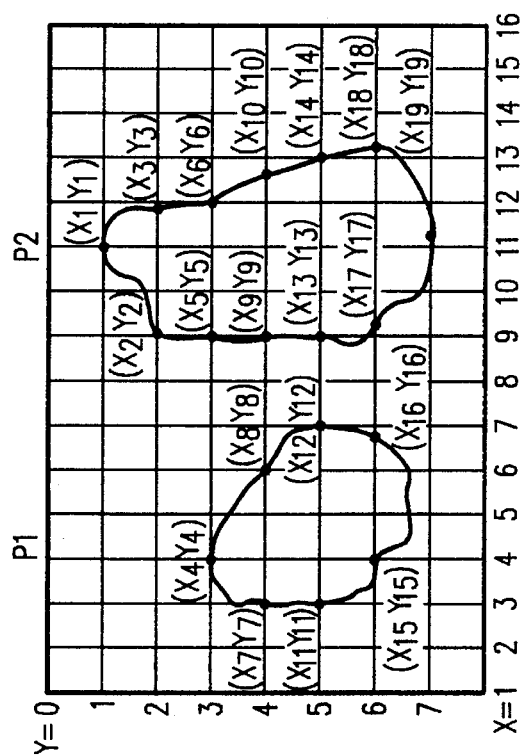
FIG. 2
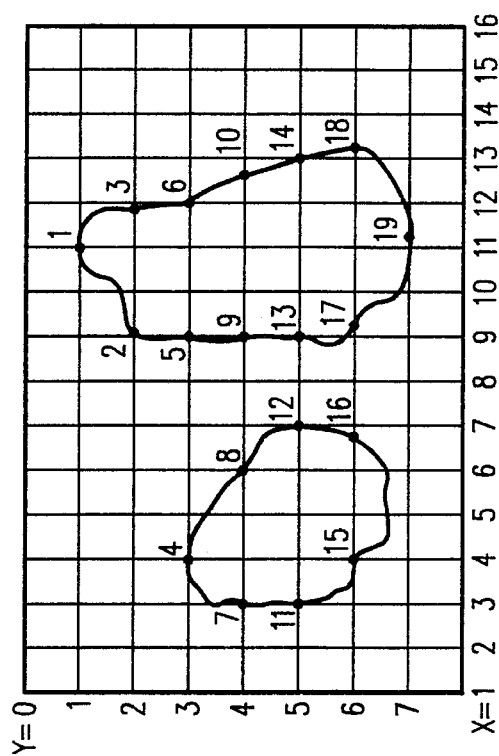
FIG. 3
FIG. 4a
FIG. 4b 5,619,032

METHOD AND APPARATUS FOR AUTOMATICALLY SELECTING THE BEST FOCAL POSITION FROM A PLURALITY OF FOCAL POSITIONS FOR A FOCUSING APPARATUS

TECHNICAL FIELD

The present invention relates to a method and an apparatus for bringing a focusing means, such as a microscope, into a focal position which is the best focal position, selected from a plurality of focal positions. The determination of the best focal position is made based upon locations in the image which define an invariant optical property of the image.

BACKGROUND OF THE INVENTION

Methods and apparatuses for automatically bringing a lens into a focusing position with respect to an image in a field of view are well known in the art. In the prior art, such methods and apparatuses have employed active means, for example, sonar or infrared transmission and reception, to determine the distance of the lens to the image and to determine the best focal position therefrom.

A passive distance determination method and apparatus is disclosed in U.S. Pat. No. 5,003,165. In that patent, however, a quantile calculation which is a histogram of the intensity of light at each of the pixels in an image is determined. Thus, the calculation of the quantile for an image depends upon the content of the image. Furthermore, the method and apparatus disclosed therein, performs the function of selecting the best focal position after a plurality of images are taken of the same field of view and the focusing means is moved in response to the calculation of the histogram from each of the different positions of the focusing means.

U.S. Pat. No. 4,338,024 discloses a flow cell wherein objects, such as biological cells, are moved in a fluid past a stationary field of view. In the application of imaging technology to a flow cell where the image is captured only once, the teachings of U.S. Pat. No. 5,003,165 cannot be applied to select the best focal position since only one image of the field of view is obtained.

SUMMARY OF THE INVENTION

In the present invention, a method of selecting the best focal position from a plurality of focal positions for a focusing means has the focusing means focusing on an object in an image in a field of view. An electrical image of the field of view is formed. The electrical image is segmented and digitized to form a plurality of digitized signals with each digitized signal representative of a pixel in the electrical image. The plurality of digitized signals are processed to determine the values of pixels at locations which define an invariant optical property of the image. The focusing means is adjusted in response to the processing step to obtain the best focal position.

An apparatus to carry out the foregoing method is also disclosed.

BRIEF DESCRIPTION OF THE DRAWINGS

FIG. 2 is an example of pixel values of two particles in the same field of view as processed by the apparatus of the present invention shown in FIG. 1, as stored in the boundary memory.

FIG. 3 is an example of values stored in the location memory of the apparatus of the present invention for the example of the field of view shown in FIG. 2.

FIG. 4a is an example of values stored in the index memory for the example shown in FIGS. 2 and 3 prior to being processed by the apparatus of the present invention shown in FIG. 1.

FIG. 4b is an example of values stored in the index memory for the example shown in FIGS. 1 and 2 processed by the apparatus of the present invention shown in FIG. 1, after one particle has been traced.

DETAILED DESCRIPTION OF THE DRAWINGS

Figure 1:
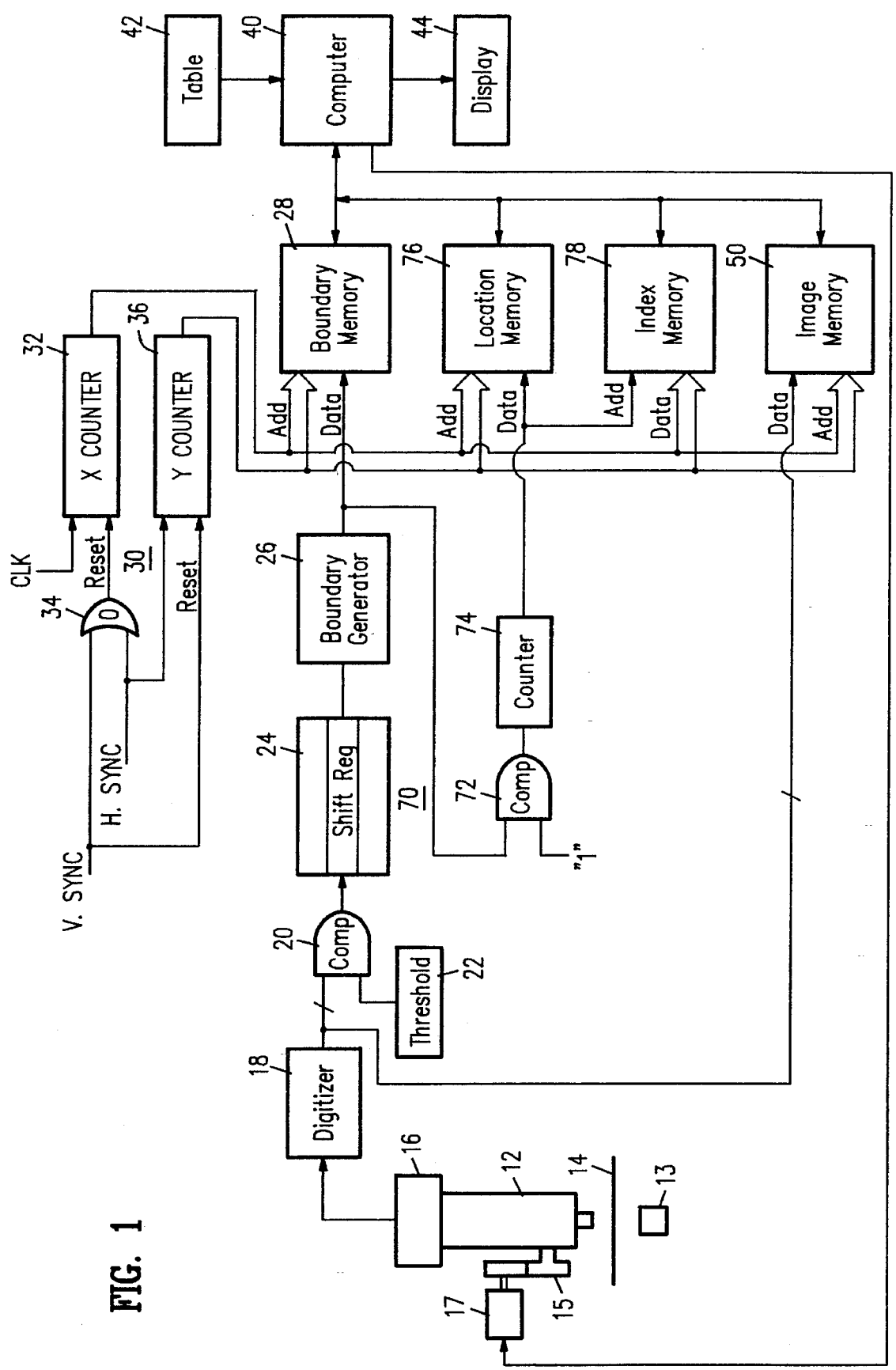
FIG. 1 is a schematic block level diagram of the apparatus of the present invention.

Referring to FIG. 1 there is shown a schematic block level diagram of an apparatus 70 of the present invention. The apparatus 70 comprises a microscope 12 directed to focus on a field of view on a microscopic slide 14 or a flow cell 14, of the type disclosed in U.S. Pat. No. 4,338,024. The field of view is illuminated by an illumination source 13, positioned opposite to the microscope 12. In the preferred embodiment, the source 13 is a strobe lamp and the field of view is of a flow cell 14. The microscope 12 is directed to focus on the field of view by an adjusting knob 15, which is driven by a motor 17, under the control of a computer 40. Thus, the computer 40 can change the focal position of the microscope 12. The image of the field of view is captured by a CCD camera 16, which is a raster scan type device. The CCD camera 16 outputs a raster scan electrical signal which is supplied to a digitizer 18. The digitizer 18 segments the waveform into a plurality of electrical signals with each electrical signal representing a pixel of the image in the field of view. The digitizer 18 further digitizes the amplitude of each electrical signal to produce a greyscale. In the preferred embodiment, the digitizer 18 produces a digital signal having 256 greyscale value. The digitized signals in raster scan format are stored in an image memory 50 in an array, at addresses supplied by an address generator 30, discussed hereinafter. The digitized signals are supplied to a comparator 20 to which a threshold value 22 is also supplied. In the event the digitized signal exceeds the threshold signal 22, then the comparator 20 outputs a binary signal of "1." In the event it does not, the comparator 20 outputs a binary signal of "0."

From the comparator 20, the binary signals are supplied to a shift register 24. The shift register 24 delays and stores the binary signals for two lines of the scan so that the signals in the shift register 24 may be operated upon by a boundary generator 26. The boundary generator 26 operates upon the pixel values stored in the shift register 24 to generate data signals in which the boundary pixels of an object in the field of view have non-zero values with all other pixel values, outside of the boundary and inside the boundary of the particle being zero. This data is then supplied to a boundary memory 28, and is stored therein in an array form with a plurality of pixels arranged in a plurality of rows and columns in the same manner as the field of view is imaged by the microscope 12.

The address to store the data signal from the boundary generator 26 and digitizer 18 are generated by an address generator 30. The address generator 30 comprises an X counter 32 which is incremented by a clock signal. It is reset by either the horizontal sync or the vertical sync signal passing through an OR gate 34. The address generator 30 also comprises a Y counter 36. The Y counter 36 counts the number of horizontal sync signals, and is reset by the vertical sync signal. The horizontal sync signal and the vertical sync signal are, of course, generated by the CCD camera 16.

The outputs of the X counter 32 and the Y counter 36 are supplied as address signals to the boundary memory 28. In this manner an array of pixel values are stored in the boundary memory 28 based upon the address signals from the address generator 30.

The boundary memory 28 is then accessed by a computer 40. The computer 40 locates the first pixel in the boundary memory 28 that has a boundary value, or a non-zero pixel value. From there, the edge of the particle is then traced based upon the look-up table 42 and is displayed on a display 44.

The apparatus 70 also comprises a location memory 76 having an addressable dimension of the same size as the boundary memory 28. Thus, there are as many X columns in the location memory 76 as there are columns in the boundary memory 28. In addition, location memory 76 has as many Y rows as there are rows in the boundary memory 28. Further, the outputs of the X counter 32 and Y counter 36 are used as address signals for the location memory 76. The apparatus 70 also comprises an index memory 78. The output of the X counter 32 and the Y counter 36 are supplied as data signals to the index memory 78. The output of the boundary generator 26 is supplied to a comparator 72 to which a binary "1" is also supplied. In the event the output of the boundary generator 26 equals or exceeds "1" then a signal is generated which is supplied to a counter 74 incrementing the counter 74. If the boundary generator 26 generates a binary "0" then the output of the comparator 72 would not increment the counter 74. The output of the counter 74 is supplied as a data signal to the location memory 76 and is used as the address signal to the index memory 78.

The operation of the apparatus 70 to locate the boundary pixel of an object in the field of view, will be explained with reference to an example. FIG. 2 is an example of two particles: P1 and P2 in the same image or field of view having their boundary pixels at the locations indicated. FIG. 2 shows location of boundary pixels (without the actual values of the pixels shown) of the two particles P1 and P2 as stored in the boundary memory 28. Since in the preferred embodiment, the CCD camera 16 is a raster scan device, the first non-zero pixel value generated by the boundary generator 26 is the pixel value on the boundary of particle P2 having locations (X1, Y1) or (11, 1). Subsequent non-zero pixel boundary values generated by the boundary generator 26 would be (X2, Y2) which is on the boundary of particle P2 having the value of (9,2), etc.

As the first non-zero pixel is generated by the boundary generator 26, it is stored in the boundary memory 28 at the location (X1, Y1). At the same time, the non-zero value of the pixel, as generated by the boundary generator 26, causes the output of the comparator 72 to increment the counter 74 to a value of "1." Thus, at the same corresponding location of (X1, Y1) in the location memory 76, the value of "1" would be stored. This is shown in FIG. 3, which represents the values stored therein in the location memory 76 for this example. At the same time, the value of "1" which is the output of the counter 74, is used as an address to the index memory 78 to store the output of the X counter 32 and Y counter 36 (X1, Y1) in the index memory 78, at the address of "1". This is shown in FIG. 4a.

As each subsequent non-zero pixel value is generated by the boundary generator 26, the output of the X counter 32 and Y counter 36 are used as the address signals to store that non-zero pixel value in the boundary memory 28. The same address locations of the boundary memory 28 or the same output values of X counter 32 and Y counter 36 are used to address the location memory 76 to store the incremented data from the counter 74. Finally, at the same time, the address to the index memory 78 is the output of the counter 74, and is used to address the index memory 78, to store the outputs of X counter 32 and Y counter 36.

Once all of the non-zero pixel values from the field of view as imaged by the CCD camera 16 have been generated by the boundary generator 26, the computer 40 would then begin the process of identifying the pixels having the characteristics of interest. Although in this embodiment, the characteristic of interest is disclosed as being a boundary edge, it can clearly be any characteristic of interest.

In the method of identifying the pixels having the characteristics of interest, the computer 40 first scans the index memory 78 sequentially from the lowest addressable position of "1" until the first "non-zero" value in the content at the scanned address is determined. In this case, at the beginning of the process, the very first addressed entry of "1" having a stored value of X1, Y1, would be retrieved by the computer 40. The computer 40 would then address the boundary memory 28 at the location of X1, Y1, and retrieve a pixel value of say P1. Using the same address signals of X1, Y1, the location memory 76 is addressed. The content of the location memory 76 at the location of X1, Y1 is the value "1." The value of that content (i.e. "1") is then used as an address to the index memory 78 and the content at that addressed location in the index memory 78 is then blanked out. In that case, the index memory 78 at the first addressed location of 1 would be blanked out.

The value of the pixel at the addressed location of X1, Y1 in the boundary memory 28, i.e. P1, is processed by the computer 40. In the event the value of the pixel P1 represents a boundary edge, the value of P1 would contain a code linking to the next non-zero pixel also along the boundary— all as disclosed in U.S. Pat. No. 4,538,299. If we assume that the linked pixel is at the location X3, Y3. The computer 40 would then retrieve the content of the boundary memory 28 at the location X3, Y3. In addition, the computer 40 would use the address X3, Y3 to address the location memory 76 to find a content at that location of being "3." Then, the computer 40 would use the value of "3", from the location memory 76, as an address to the index memory 78 to zero out the content at the addressed location of "3" in the index memory 78. This would cause the content X3, Y3 to be blanked out.

The computer 40 would then retrieve the value of the pixel at X3, Y3 from the boundary memory 28 and analyze and determine the next linked non-zero pixel value, having the characteristic of interest. Let us assume that this is X6, Y6. The computer would then address the boundary memory 28 at X6, Y6 to read out the value of the non-zero pixel at that location. In addition, the computer 40 would use X6, Y6 as addresses for the location memory 76 to read out the pixel value at that location which is "6." Then, the computer will use the value of "6" as an address in the index memory 78 and blank out its content which is X6, Y6.

This process continues until all of the boundary edges of particle P2 have been determined. In the process, selective locations in the index memory 78 are blanked out. In the example shown in FIGS. 2, 3, and 4, this means that addressed locations 1, 3, 6, 10, 14, 18, 19, 17, 13, 9, 5, 2 in the index memory 78 are blanked out. The result is shown in FIG. 4b.

The computer 40 then scans the index memory 78 starting with the lowest addressed location of "1" to determine if a non-zero value remains in the index memory 78. In this case, after 4 address locations or 4 tests, the computer 40 would find that the addressed location of 4 results in a non-zero value of X4, Y4 stored in the index memory 78. It would then use the value of X4, Y4 as a starting address for addressing the boundary memory 28 and complete the cycle all over again.

Figure 5:
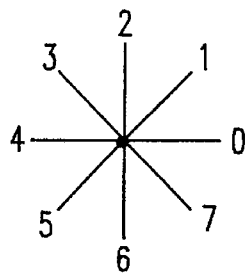
FIG. 5 is a schematic diagram of the locations by which one pixel on the boundary is linked to another pixel on the boundary.

As disclosed in U.S. Pat. No. 4,538,299, once the pixel boundary has been located, the value of that pixel contains the linkage to the next immediate fixed boundary pixel. FIG. 5 shows schematically the linkage of a boundary pixel to an immediate adjacent boundary pixel, with a value for the direction assigned. Since there are eight possible directions, there are eight values (0–7). As disclosed in U.S. Pat. No. 4,538,299, the tracing of the boundary edge occurs in a clockwise manner. Thus, for example, if the next boundary pixel is indicated as being in the direction of "7", the next immediate adjacent pixel along the boundary would be located in a direction of +1 X direction and −1 Y direction. The computer 40 takes the value of the direction, i.e. "7", adds 2 thereto and takes the modulus thereof based upon 8. For example, if the next immediate pixel is in the direction of "7", the computer calculates $MOD_8 (7+2)=1$. As can be seen from FIG. 5, the direction of "1" is a direction perpendicular to "7" and would lead to pixel values outside the boundary of the particle of interest. The computer 40 would then select the three, immediate, contiguous pixels to the boundary pixel along the direction of "1".

Figure 6:
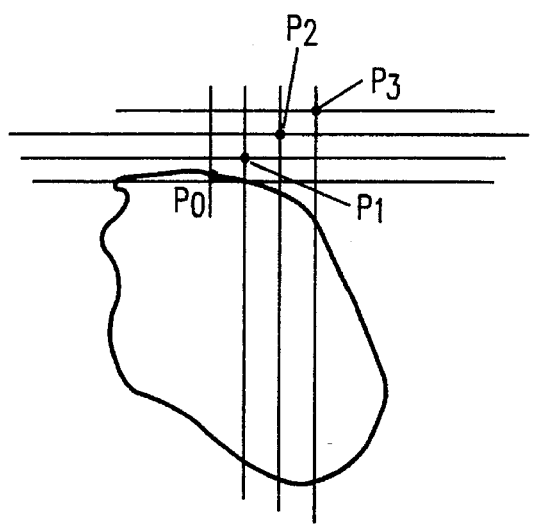
FIG. 6 is a schematic diagram of a portion of an image showing pixels along the boundary and outside thereof defining the invariant optical properties of the image.

Referring to FIG. 6, there is shown schematically a portion of an image of the pixels that would be selected by the computer 40 based upon the example shown in FIG. 5. Assuming pixel $P_0$ is along the boundary thereof, the computer 40 would select pixels $P_1$, $P_2$ and $P_3$, all shown as being along the direction of "1". Pixel $P_0$ is on the boundary. Pixel $P_1$ is the first pixel, outside of $P_0$, which is immediately adjacent and contiguous to pixel $P_0$. Pixel $P_2$ is a second pixel outside of $P_0$ which is immediately adjacent and contiguous to pixel $P_1$. Finally, pixel $P_3$ is outside of $P_0$ and is immediately adjacent and contiguous to pixel $P_2$. The computer 40 calculates a quotient of $$Q = M/N \tag{1}$$

for an object in each electrical image;

where N—total number of pixels on the boundary of said object;

where M—total number of pixels ($P_0$) on the boundary whose associated pixels outside thereof ($P_1$, $P_2$ and $P_3$) satisfy the relationship $$P_1 - P_0 \geq 0 \tag{2}$$

$$P_2 - P_1 \geq 0 \tag{3}$$

$$P_3 - P_2 \leq 0 \tag{4}$$

It has been determined that if the microscope 12 is in the best focal position, a "halo" of two pixel width would surround the boundary of each particle in the field of view with the "halo" decreasing in intensity for the third pixel. More particularly, the halo would have the property as described above wherein the relationship between $P_0$, $P_1$, $P_2$ and $P_3$ is shown in equations (2)–(4). Thus, the calculation of the quotient Q is a determination of the "goodness" of the focus. If the "halo", i.e. the foregoing described relationship between pixel $P_0$, $P_1$, $P_2$ and $P_3$, were satisfied for all boundary pixels, then the quotient would equal 1.0. A poorly focused image having a small amount of "halo" or a few boundary pixels satisfying the above relationship, would have a quotient Q that approaches 0. Thus, the calculation of Q results in a number between 0 and 1 with 1 being the best focal position and 0 being the worst.

Alternatively, the computer 40 can calculate the following:

$$Q = M/R \tag{5}$$

where M is as previously described and R is the total number of pixels ($P_0$) on the boundary whose associated pixels ($P_1$, $P_2$ and $P_3$) satisfy the relationship $$P_1 - P_0 \geq 0 \tag{6}$$

$$P_2 - P_1 \geq 0 \tag{7}$$

$$P_3 - P_2 \geq 0. \tag{8}$$

This results in the quotient having a value that ranges from 0 for bad focus to "infinity" at perfect focus.

Moreover, a high value of R indicates a focal position with the lens too close to the object. Thus, a combination of M and R may be used to determine not only "good" focus, but also on which side of the "good" focus the lens is positioned.

Although measuring the "halo" for one particle in one image and setting the focal position thereof in theory selects the best focal position, it has been found that the measurement of one image with one particle results in a "noisy" measurement. Thus, in another aspect of the present invention, the value of ten (10) Qs determined for ten (10) images is determined. Although an "average" of the best focal points over 10 different images can be performed, even then, however, the "average" may still be "noisy". Thus, a certain percentile of the distribution of the ten (10) Qs is taken. In the preferred embodiment, 80th percentile was selected.

From the foregoing, it can be seen that with the method of the present invention, the computer 40 adjusts the knob 15 of the microscope 12 to a selected first focal position, through the motor 17. Ten images with particles therein are obtained. The values of Q over the 10 images are taken and an 80th percentile of those values is calculated. The computer 40 then adjusts the microscope 12 through the use of the motor 17 connected to the knob 15 to a different position. Again, another 10 images of particles flowing through the flow cell 14 are taken. The values of Q for the 10 images are also made. This process continues until a plurality of positions of the knob 15 are made.

From the plurality of positions of the knob 15 and their corresponding values of a certain function, such as a percentile, of the values of Q, the position of the microscope 12 is selected that yields the maximum value of the certain function of Q.

Figure 7:
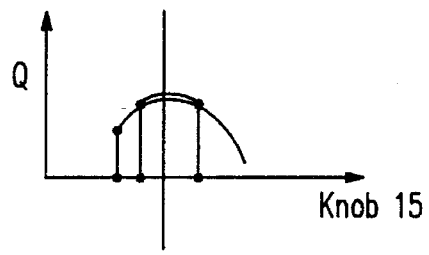
FIG. 7 is a graph showing positions of the microscope and the corresponding Q value, and the interpretation of thereof to obtain the best focal position.

Referring to FIG. 7, there is shown another aspect of the present invention. Since the knob 15 to the microscope 12 is selected at a number of detent positions, it is possible that one of the selected positions of the knob 15 does not place the microscope 12 at the exact best focal position. FIG. 7 shows in the horizontal direction the knob 15 in a plurality of discrete or detent positions and each of those positions having a corresponding Q value as discussed heretofore. As can be seen, the best focal position may lie between two detent positions of the knob 15. In another aspect of the present invention, after the maximum Q value is determined, an interpolated maximum position is calculated. The two Q values that border the maximum position are used to interpolate the apex of a parabola that passes through the three Q values. The apex of the interpolated parabola would then correspond to the position of the knob 15 which would be at the "best" focal position.

As can be seen from the foregoing, with the method and apparatus of the present invention by using an invariant optical property of the image, one can determine the best focal position of image based upon other images which were captured once. Although the preferred embodiment discloses the invariant optical property as a "halo" of two pixel width bordering the boundary of the particle, the invention need not be so limited. First, clearly depending upon the resolution of the optics and the electronics, the width of the "halo" need not be limited to two pixels. Moreover, the "halo" may not be the only invariant optical property. Other "signatures" of best focal position may be the intensity of a carrier frequency which is independent of the content of the image. For example, the source 13 might emit a particular frequency or time-varying "signature" which is not affected by the particles and fluid through which the source 13 images, but is affected by the focal position of the microscope 12. Finally, although the foregoing method and apparatus has been described in the preferred embodiment being applicable to a flow cell where the particles flow by the field of view and is imaged only once, clearly, the method and apparatus of the present invention can be used with a slide 14 where repeated images of the same field of view may be taken and from which the best focal position may be selected.

What is claimed is:

1. A method of selecting the best focal position from a plurality of focal positions for a focusing means focusing on an object in a field of view, said method comprising the steps of:

forming an electrical image of said field of view;

segmenting and digitizing said electrical image to form a plurality of digitized signals, each digitized signal representative of a pixel in said electrical image;

processing said plurality of digitized signals to determine the values of pixels at locations defining an invariant optical property of said image, wherein said locations defining an invariant optical property are locations of a boundary pixel and its neighbors, and wherein said processing step further comprising:

calculating a quotient of:

$$Q = M/N$$

for an object in each electrical image;

where N—total number of pixels on the boundary of said object;

where M—total number of pixels ($P_0$) on the boundary whose associated pixels outside thereof ($P_1$, $P_2$ and $P_3$) satisfy the relationship $$P_1 - P_0 \geq 0$$

$$P_2 - P_1 \geq 0$$

$$P_3 - P_2 \leq 0$$

where $P_0$ is the boundary pixel of said object;

$P_1$ is the first pixel, outside of $P_0$, immediately adjacent and contiguous thereto;

$P_2$ is the second pixel, outside of $P_0$, immediately adjacent and contiguous to $P_1$;

$P_3$ is the third pixel, outside of $P_0$, immediately adjacent and contiguous to $P_2$; and adjusting said focusing means in response to said processing step to obtain the best focal position.

2. The method of claim 1 wherein said processing step further comprising:

recording a plurality of Q values for a plurality of objects in a plurality of electrical images.

3. The method of claim 2 wherein said processing step further comprising:

calculating a certain function of said plurality of Q values to form a Q value function.

4. The method of claim 3 wherein said adjusting step further comprising:

moving said focusing means to a plurality of different positions;

determining the Q value function for each of said different positions to form a plurality of Q value functions; and selecting the position of said focusing means corresponding to the maximum value of the plurality of Q value functions.

5. The method of claim 4 wherein said adjusting step further comprising:

selecting the positions of said focusing means, having corresponding values of Q value functions that border on the maximum Q value function;

interpolating the position of said focusing means based upon the maximum Q value function and the corresponding Q value functions that border thereon.

6. A method of selecting the best focal position from a plurality of focal positions for a focusing means focusing on an object in a field of view, said method comprising the steps of:

forming an electrical image of said field of view;

segmenting and digitizing said electrical image to form a plurality of digitized signals, each digitized signal representative of a pixel in said electrical image;

processing said plurality of digitized signals to determine the values of pixels at locations defining an invariant optical property of said image, wherein said locations defining an invariant optical property are locations of a boundary pixel and its neighbors;

adjusting said focusing means in response to said processing step to obtain the best focal position;

wherein said processing step further calculates a value indicative of the direction by which said focusing means should be moved to obtain the best focal position; and wherein said value indicative of the direction by which said focusing means should be moved is calculating:

$$Q = M/R$$

for an object in each electrical image;

where M—total number of pixels ($P_0$) on the boundary whose associated pixels outside thereof ($P_1$, $P_2$ and $P_3$) satisfy the relationship $$P_1 - P_0 \geq 0$$
$$P_2 - P_1 \geq 0$$
$$P_3 - P_2 \leq 0$$

where R—total number of pixels ($P_0$) on the boundary whose associated pixels outside thereof ($P_1$, $P_2$ and $P_3$) satisfy the relationship $$P_1 - P_0 \geq 0$$
$$P_2 - P_1 \geq 0$$
$$P_3 - P_2 \geq 0$$

where $P_0$ is the boundary pixel of said object;

$P_1$ is the first pixel, outside of $P_0$, immediately adjacent and contiguous thereto;

$P_2$ is the second pixel, outside of $P_0$, immediately adjacent and contiguous to $P_1$;

$P_3$ is the third pixel, outside of $P_0$, immediately adjacent and contiguous to $P_2$.

7. The method of claim 6 wherein said processing step further comprising:

recording a plurality of Q values for a plurality of objects in a plurality of electrical images.

8. The method of claim 7 wherein said processing step further comprising:

calculating a certain function of said plurality of Q values to form a Q value function.

9. The method of claim 8 wherein said adjusting step further comprising:

moving said focusing means to a plurality of different positions;

determining the Q value function for each of said different positions to form a plurality of Q value functions; and selecting the position of said focusing means corresponding to the maximum value of the plurality of Q value functions.

10. The method of claim 9 wherein said adjusting step further comprising:

selecting the positions of said focusing means, having corresponding values of Q value functions that border on the maximum Q value function;

interpolating the position of said focusing means based upon the maximum Q value function and the corresponding Q value functions that border thereon.

11. A method of selecting the best focal position from a plurality of focal positions for a focusing means focusing on an object in a field of view, said method comprising the steps of:

forming an electrical image of said field of view;

segmenting and digitizing said electrical image to form a plurality of digitized signals, each digitized signal representative of a pixel in said electrical image;

processing said plurality of digitized signals to determine the values of pixels at locations defining an invariant optical property of said image;

calculating a determinative value for said object in said electrical image, based upon the values of pixels at locations defining an invariant optical property of said image;

recording a plurality of determinative values for a plurality of objects in a plurality of electrical images; and adjusting said focusing means in response to said processing step to obtain the best focal position.

12. The method of claim 11 wherein said processing step further comprising:

calculating a certain function of said plurality of determinative values to form a determinative value function.

13. The method of claim 12 wherein said adjusting step further comprising:

moving said focusing means to a plurality of different positions;

determining the determinative value function for each of said different positions to form a plurality of determinative value functions; and selecting the position of said focusing means corresponding to the maximum value of the plurality of determinative value functions.

14. The method of claim 13 wherein said adjusting step further comprising:

selecting the positions of said focusing means, having corresponding values of determinative value functions that border on the maximum determinative value function;

interpolating the position of said focusing means based upon the maximum determinative value function and the corresponding determinative value functions that border thereon.

15. The method of claim 14 wherein said focusing means focuses on a field of view of a flow cell.

16. The method of claim 15 further comprising the step of:

flowing a plurality of objects in a fluid past a field of view in the flow cell; and forming a plurality of electrical images.

17. The method of claim 16 further comprising the step of:

illuminating said field of view.

18. The method of claim 17 wherein said locations defining an invariant optical property are locations near the boundary of each object.

19. A method of selecting the best focal position from a plurality of focal positions for a focusing means focusing on an object in a field of view, said method comprising the steps of:

forming an electrical image of said field of view;

segmenting and digitizing said electrical image to form a plurality of digitized signals, each digitized signal representative of a pixel in said electrical image;

processing said plurality of digitized signals to determine the values of pixels at locations defining an invariant optical property of said image;

calculating a determinative value for said object in said electrical image, based upon the values of pixels at locations defining an invariant optical property of said image;

adjusting said focusing means in response to said processing step to obtain the best focal position;

wherein said processing step further comprising the step of calculating a value indicative of the direction by which said focusing means should be moved to obtain the best focal position; and wherein said value indicative of the direction by which said focusing means should be moved is calculating:

$$Q = M/R$$

for an object in each electrical image;
where M—total number of pixels ($P_0$) on the boundary whose associated pixels outside thereof ($P_1$, $P_2$ and $P_3$) satisfy the relationship $$P_1 - P_0 \geqq 0$$
$$P_2 - P_1 \geqq 0$$
$$P_3 - P_2 \leqq 0$$

where R—total number of pixels ($P_0$) on the boundary whose associated pixels outside thereof ($P_1$, $P_2$ and $P_3$) satisfy the relationship $$P_1 - P_0 \geqq 0$$
$$P_2 - P_1 \geqq 0$$
$$P_3 - P_2 \geqq 0$$

where
$P_0$ is the boundary pixel of said object;
$P_1$ is the first pixel, outside of $P_0$, immediately adjacent and contiguous thereto;
$P_2$ is the second pixel, outside of $P_0$, immediately adjacent and contiguous to $P_1$;
$P_3$ is the third pixel, outside of $P_0$, immediately adjacent and contiguous to $P_2$.

20. A method of selecting the best focal position from a plurality of focal positions for a focusing means focusing on an object in a field of view, said method comprising the steps of:
forming an electrical image of said field of view;
segmenting and digitizing said electrical image to form a plurality of digitized signals, each digitized signal representative of a pixel in said electrical image;
processing said plurality of digitized signals to determine the values of pixels at locations defining an invariant optical property of said image;
calculating a determinative value for said object in said electrical image, based upon the values of pixels at locations defining an invariant optical property of said image;
adjusting said focusing means in response to said processing step to obtain the best focal position; and
wherein said determinative value is calculated in accordance with:

$$Q = M/N$$

for an object in each electrical image;
where N—total number of pixels on the boundary of said object;
where M—total number of pixels ($P_0$) on the boundary whose associated pixels outside thereof ($P_1$, $P_2$ and $P_3$) satisfy the relationship $$P_1 - P_0 \geqq 0$$
$$P_2 - P_1 \geqq 0$$
$$P_3 - P_2 \leqq 0$$

where
$P_0$ is the boundary pixel of said object;
$P_1$ is the first pixel, outside of $P_0$, immediately adjacent and contiguous thereto;
$P_2$ is the second pixel, outside of immediately adjacent and contiguous to $P_1$;
$P_3$ is the third pixel, outside of $P_0$, immediately adjacent and contiguous to $P_2$.

21. A method of selecting the best focal position from a plurality of focal positions for a focusing means focusing on an object in a field of view in a flow cell, said method comprising the steps of:
flowing a plurality of objects in a fluid past the field of view in the flow cell;
illuminating the field of view;
forming a plurality of electrical images; each electrical image of said field of view;
segmenting and digitizing said electrical image to form a plurality of digitized signals, each digitized signal representative of a pixel in said electrical image;
processing said plurality of digitized signals to determine the values of pixels at locations defining an invariant optical property of said image;
calculating a determinative value for said object in said electrical image, based upon the values of pixels at locations defining an invariant optical property of said image;
recording a plurality of determinative values for a plurality of objects in a plurality of electrical images; and
adjusting said focusing means in response to said processing step to obtain the best focal position.

22. The method of claim 21 wherein said processing step further comprising:
calculating a certain function of said plurality of determinative values to form a determinative value function.

23. The method of claim 22 wherein said adjusting step further comprising:
moving said focusing means to a plurality of different positions;
determining the determinative value function for each of said different positions to form a plurality of determinative value functions; and
selecting the position of said focusing means corresponding to the maximum value of the plurality of determinative value functions.

24. The method of claim 23 wherein said adjusting step further comprising:
selecting the positions of said focusing means, having corresponding values of determinative value functions that border on the maximum determinative value function;
interpolating the position of said focusing means based upon the maximum determinative value function and the corresponding determinative value functions that border thereon.

25. An apparatus for automatically selecting the best focal position from a plurality of focal positions for a focusing means focusing on an object in an image in a field of view, wherein each object has a boundary, said apparatus comprising:
means for forming an electrical image of said field of view;
means for segmenting and digitizing said electrical image to form a plurality of digitized signals, each digitized signal representative of a pixel in said electrical image;

means for processing said plurality of digitized signals to determine values of pixels at locations defining an invariant optical property of said image, wherein the locations defining an invariant optical property of each image are locations near the boundary of each object;

wherein said processing means further comprising:

means for calculating $$Q = M/N$$

for an object in each electrical image where N—total number of pixels on the boundary;

where M—total number of pixels ($P_0$) on the boundary whose associated pixels outside thereof ($P_1$, $P_2$ and $P_3$) satisfy the relationship $$P_1 - P_0 \geq 0$$

$$P_2 - P_1 \geq 0$$

$$P_3 - P_2 \leq 0$$

where $P_0$ is the boundary pixel of said object;

$P_1$ is the first pixel, outside of $P_0$, immediately adjacent and contiguous thereto;

$P_2$ is the second pixel, outside of $P_0$, immediately adjacent and contiguous to $P_1$;

$P_3$ is the third pixel, outside of $P_0$, immediately adjacent and contiguous to $P_2$; and means for adjusting said focusing means in response to said processing means to obtain the best focal position.

26. The apparatus of claim 25 wherein said processing means further comprising:

means for storing a plurality of values of Q for a plurality of objects in a plurality of electrical images; and means for calculating a certain function of said plurality of Q values to form a Q value function.

27. The apparatus of claim 26 wherein said adjusting means further comprising:

means for moving said focusing means to a plurality of different positions;

means for determining the Q value function for each of said plurality of different positions; and means for selecting the position of said focusing means corresponding to the maximum Q value function.

28. The apparatus of claim 27 wherein said adjusting means further comprising:

means for selecting the position of said focusing means based upon the maximum Q value function, and Q value functions that border thereon.

* * * * *